United States Patent
Buswell

(10) Patent No.: US 10,443,884 B2
(45) Date of Patent: Oct. 15, 2019

(54) CABINET FOR AIR HANDLER UNITS

(71) Applicant: Carrier Corporation, Farmington, CT (US)

(72) Inventor: Thomas Buswell, Clay, NY (US)

(73) Assignee: CARRIER CORPORATION, Farmington, CT (US)

(*) Notice: Subject to any disclaimer, the term of this patent is extended or adjusted under 35 U.S.C. 154(b) by 637 days.

(21) Appl. No.: 14/329,017

(22) Filed: Jul. 11, 2014

(65) Prior Publication Data

US 2015/0023728 A1    Jan. 22, 2015

Related U.S. Application Data

(60) Provisional application No. 61/846,959, filed on Jul. 16, 2013.

(51) Int. Cl.
| | | |
|---|---|---|
| *F24F 13/20* | (2006.01) | |
| *F16B 11/00* | (2006.01) | |
| *F24F 3/044* | (2006.01) | |
| *F16B 5/02* | (2006.01) | |

(52) U.S. Cl.
CPC ............ *F24F 13/20* (2013.01); *F24F 3/0442* (2013.01); *F16B 5/02* (2013.01); *F16B 11/006* (2013.01); *Y10T 403/477* (2015.01)

(58) Field of Classification Search
CPC ..... F24F 3/0442; F24F 13/20; Y10T 403/477; F24H 9/02; F24H 1/182; F24H 1/183; B65D 81/3818; B65D 81/382; B65D 81/3823; F16B 11/006

USPC ........................................ 302/108; 454/242
See application file for complete search history.

(56) References Cited

U.S. PATENT DOCUMENTS

| | | | |
|---|---|---|---|
| 4,694,119 A * | 9/1987 | Groenewegen | G11B 33/142 169/48 |
| 4,860,918 A * | 8/1989 | Wuyten | E04H 1/1238 220/1.5 |
| 6,374,571 B1 | 4/2002 | Mann | |
| 6,497,256 B1 | 12/2002 | Adams et al. | |
| 6,530,630 B2 | 3/2003 | Herbeck et al. | |
| 6,658,904 B2 | 12/2003 | Herbeck et al. | |
| 6,676,234 B2 | 1/2004 | Herbeck et al. | |
| 6,742,990 B2 | 6/2004 | Dehning et al. | |
| 7,338,400 B2 | 3/2008 | Pierjok et al. | |
| 7,526,903 B2 | 5/2009 | Kandasamy | |
| 7,530,204 B2 * | 5/2009 | Cook | B32B 7/02 52/268 |
| 8,282,452 B2 | 10/2012 | Grigsby | |
| 2004/0063398 A1 | 4/2004 | Beser et al. | |
| 2007/0052333 A1 | 3/2007 | Freire | |
| 2007/0204752 A1 | 9/2007 | Hord et al. | |
| 2008/0203866 A1 | 8/2008 | Chamberlain | |

(Continued)

FOREIGN PATENT DOCUMENTS

| | | | |
|---|---|---|---|
| DE | 3929442 A1 * | 3/1991 | ............ F24F 3/0442 |
| GB | 640703 A * | 7/1950 | ......... B65D 81/3823 |
| GB | 2280951 A | 2/1995 | |

*Primary Examiner* — Steven S Anderson, II
(74) *Attorney, Agent, or Firm* — Cantor Colburn LLP

(57) ABSTRACT

A plurality of panels affixed to one another used for construction of an air handler unit including a first panel member having first circumference affixed to a second panel member having a second circumference; wherein the second circumference is smaller than the first circumference to form a first flange.

12 Claims, 3 Drawing Sheets

(56) References Cited

U.S. PATENT DOCUMENTS

2011/0076092 A1\* 3/2011 Joh .......................... B63B 3/68
                                                         403/42
2011/0291533 A1  12/2011 McFarland
2012/0318808 A1\* 12/2012 McCormick .......... F16L 59/065
                                                      220/592.21

\* cited by examiner

CABINET FOR AIR HANDLER UNITS

CROSS REFERENCE TO RELATED APPLICATIONS

The present application is related to, and claims the priority benefit of, U.S. Provisional Patent Application Ser. No. 61/846,959 filed Jul. 16, 2013, the contents of which are hereby incorporated in their entirety into the present disclosure

TECHNICAL FIELD OF THE DISCLOSED EMBODIMENTS

The presently disclosed embodiments generally relate to heating, ventilation and air conditioning (HVAC) equipment, and more particularly, to a cabinet for air handler units.

BACKGROUND OF THE DISCLOSED EMBODIMENTS

Current air handler cabinets utilize many joints, fasteners, and compounds in their construction which create potential areas for air leakage and add costs in manufacturing. Additionally, known air handler units are typically constructed by securing a number of insulation panels to a framework to form a closed insulated cabinet. This also adds costs to manufacturing, and creates the potential for installation error. There is, therefore, a need for an insulated cabinet for air handler units that may be constructed without a framework and that will reduce the potential for air leakage.

SUMMARY OF THE DISCLOSED EMBODIMENTS

In one aspect, a cabinet for air handler units is provided. The cabinet includes a plurality of panels affixed to one another to form an enclosure having at least two side wall panels, at least one end wall panel, at least one bottom wall panel, and at least one top wall panel. Each panel includes a first panel member having a first panel member first side, a first panel member second side, a first panel circumferential side, and a first panel circumference. Each panel further includes a second panel member having a second panel member first side, a second panel member second side, a second panel circumferential side, and a second panel circumference. The first panel member is affixed to the second panel member via an adhesive. In one embodiment, the second circumference is smaller than the first circumference to form a first flange along the perimeter of the first panel member. In one embodiment, the first panel member and the second panel member are each formed from sheet metal to create a cavity therein. An insulation material may be injected into each cavity. In one embodiment, the first panel member second side may be flat, and in another embodiment the first panel member second side may be pitched. In one embodiment, a gasket may be affixed along the first flange.

In one embodiment, the cabinet includes at least two base rails, each having a distal end, a proximal end, and a second flange along the length of the base rail. In one embodiment, each side wall panel may be formed by affixing a portion of the first flange to the outside portion of the second flange of each of the at least two base rails using at least one fastener.

In one embodiment, the bottom wall panel may be formed by placing a first portion of the first flange in contact with the bottom portion of the second flange of one of the at least two base rails, and placing a second portion of the first flange in contact with the bottom portion of the second flange of the other of said two base rails. The bottom wall panel is secured in place upon insertion of at least one fastener through each side wall panel.

In one embodiment, each end wall may be formed by placing a first portion of the first flange in contact with a portion of the second circumferential side of one of the side wall panels. A second portion of the first flange may be placed in contact with a portion of the second circumferential side of the other side wall panel. A third portion of the first flange may be placed in contact with the first circumferential side of the at least one bottom wall panel. The end wall panel is secured in place upon insertion of at least one fastener through the end wall.

In one embodiment, the top wall panel may be formed by placing a first portion of the first flange in contact with a portion of the first circumferential side of one of the side wall panels. A second portion of the first flange may be placed in contact with a portion of the first circumferential side of the other side wall panel. A third portion of the first flange may be placed in contact with a portion of the first circumferential side of one of the end wall panels. A fourth portion of the first flange may be placed in contact with a first portion of the first circumferential side of the other end wall panel. The top wall panel is secured in place upon insertion of at least one fastener through the top wall.

In another embodiment, the top wall panel may be formed by placing a first portion of the first flange in contact with a portion of the second circumferential side of one of the side wall panels. A second portion of the first flange may be placed in contact with a portion of the second circumferential side of the other side wall panel. A third portion of the first flange may be placed in contact with a portion of the second circumferential side of one of the end wall panels. A fourth portion of the first flange may be placed in contact with a first portion of the second circumferential side of the other end wall panel. The top wall panel is secured in place upon insertion of at least one fastener through the top wall.

In one embodiment, the cabinet includes a first bracket affixed to the distal end of the at least two base rails, and a second bracket affixed to the proximal end of the at least two base rails.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
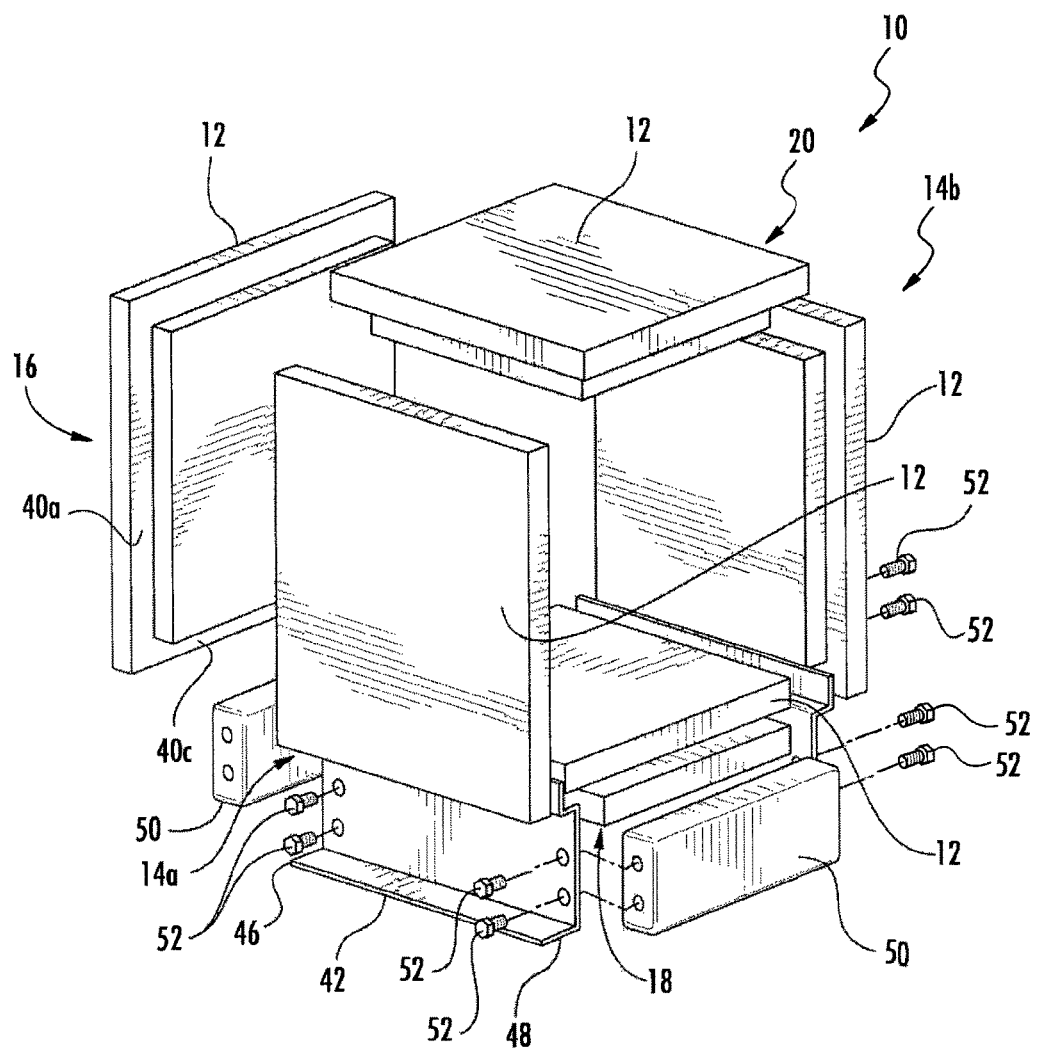
FIG. 1 is a perspective view of a cabinet for an air handler unit in an exemplary embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a perspective view of an embodiment of the present disclosure, indicated generally at 10. The cabinet 10 includes a plurality of panels 12 affixed to one another to form an enclosure. The plurality of panels 12 having at least two side wall panels 14, at least one end wall panel 16, at least one bottom wall panel 18, and at least one top wall panel 20.

Figure 2:
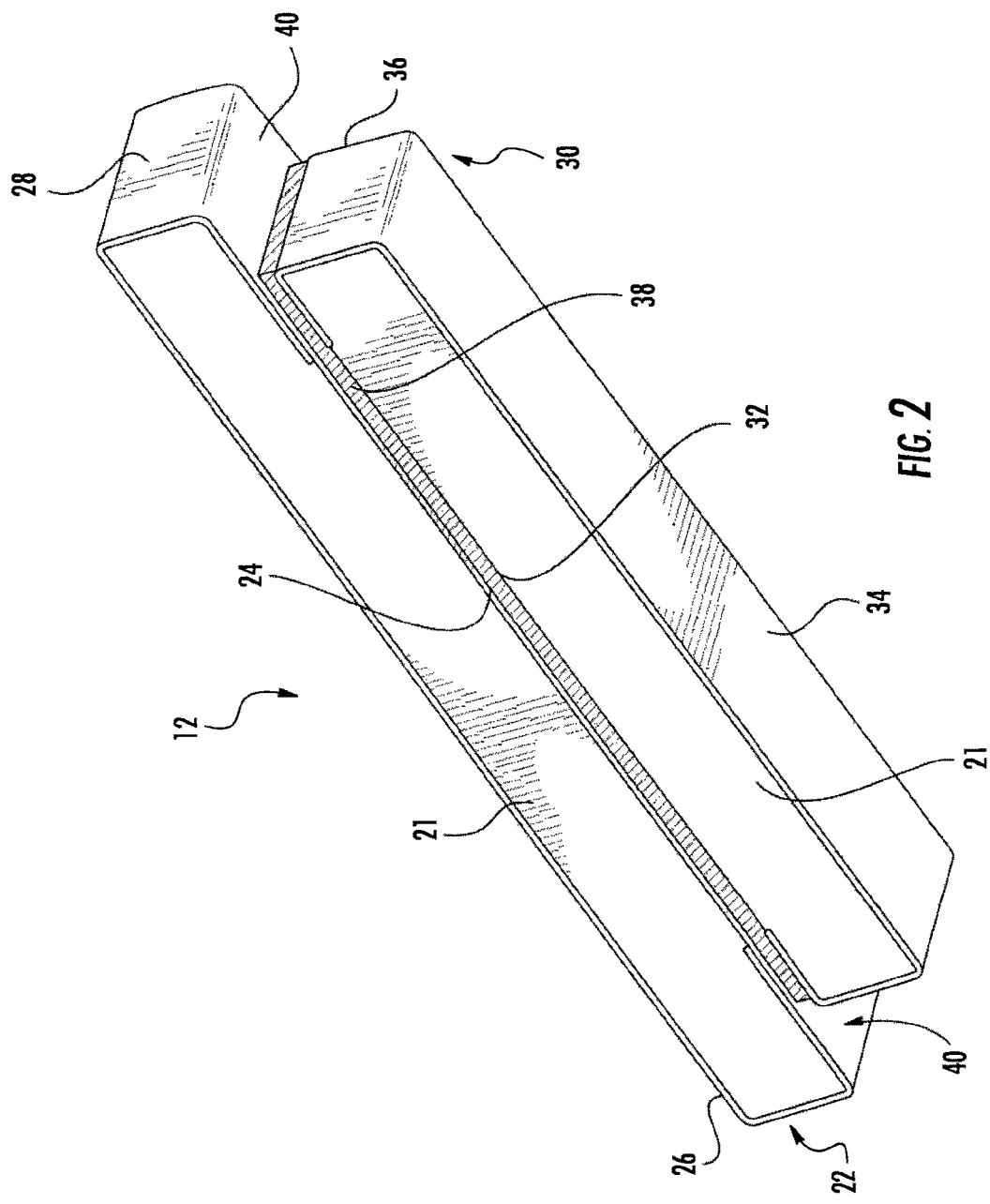
FIG. 2 is a cross-sectional view of a panel according to an embodiment.

FIG. 2 illustrates a cross-sectional view of an exemplary panel 12. The panel includes a first panel member 22 having a first panel member first side 24, a first panel member second side 26, a first panel circumferential side 28, and a first panel circumference. Each panel 12 further includes a second panel member 30 having a second panel member first side 32, a second panel member second side 34, a second panel circumferential side 36, and a second panel circumference. The first panel member 22 is affixed to the second panel member 30 via an adhesive 38. It will be appreciated that the size of the panels 12 may vary depending on the air handler unit requirements. In an exemplary embodiment, the adhesive 38 is a double sided tape which acts as a thermal barrier between the first panel member 22 and the second panel member 30. However, it will be appreciated that any adhesive known in the art may be used to affix the first panel member 22 and the second panel member 30. In other embodiments, the first panel member 22 and the second panel member 30 may be affixed to one another by any desired means, such as by welding or soldering to name two non-limiting examples.

In one embodiment, the first panel member 22 and the second panel member 30 are each formed from sheet metal to create a cavity therein. The first panel member 22 and the second panel member 30 may be injected with an insulation material 21, such as foam insulation to name one non-limiting example, into each cavity. The first panel member 22 and the second panel member 30 may be held in a press until the insulation material 21 is dry to ensure flatness. In one embodiment, the first panel member second side 26 may be flat. In another embodiment, the first panel member second side 26 may be pitched. For example, in installations where the cabinet may be exposed to rain or other inclement weather conditions, it may be desirable to have the first panel member second side 26 pitched to direct water away from the cabinet 10 to prevent water from pooling on top of the cabinet 10.

In an exemplary embodiment, the second circumference of the second panel member 30 is smaller than the first circumference of first panel member 22 to form a first flange 40. For example, the first flange 40 may form a 1"×1" perimeter along the outer circumference of the first panel member first side 24. However, it will be appreciated from the present description that the first flange 40 may have any dimension suitable for interlocking the panels 12. It will also be appreciated that the first flange 40 reduces the risk of installation error by providing a male/female joint to interlock the panels 12. In one embodiment, a gasket (not shown) may be affixed along the first flange 40. The gasket (not shown) may be used to reduce the possibility of a leak path being formed at the joints between the panels 12.

Figure 3:
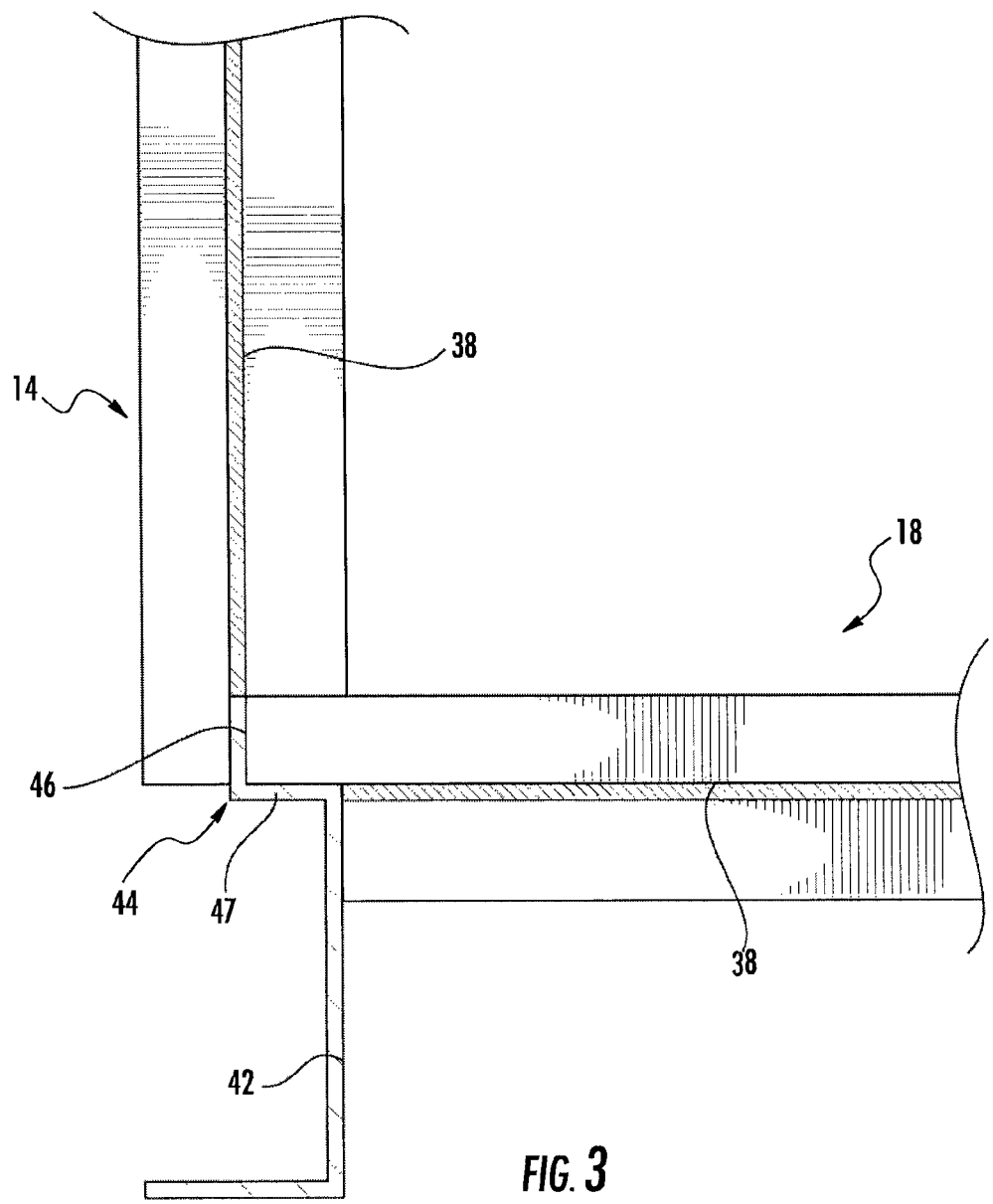
FIG. 3 is a perspective view of a base rail according to an embodiment.

Referring to FIG. 1 and FIG. 3, an exemplary embodiment of the cabinet 10, includes at least two base rails 42 each having a distal end 46, a proximal end 48, and a second flange 44 along the length of the base rail 42. In one embodiment, each side wall 14 may be formed by affixing a portion of the first flange 40 to the outside portion 45 of the second flange 44 of each of the at least two base rails 42.

In one embodiment, the bottom wall panel 18 may be formed by placing a first portion of the first flange 40 in contact with the bottom portion 47 of the second flange 44 of one of the at least two base rails 42; and placing a second portion of the first flange 40 in contact with the bottom portion 47 of the second flange 44 of the other of said two base rails 42. The bottom wall panel 18 is secured in place upon insertion of at least one fastener 52 through each side wall panel 14. Because these fasteners 52 extend into the interiors of the panels 12, they do not provide a potential leak path from the interior to the exterior of the cabinet 10.

In one embodiment, each end wall panel 16 may be formed by placing a first portion of the first flange 40a in contact with a first portion of the second circumferential side 36 of one of the side wall panels 14a to form an end wall first joint. A second portion of the first flange (not shown) may be placed in contact with a first portion of the second circumferential side 36 of the other side wall panel 14b to form an end wall second joint. A third portion of the first flange 40c may be placed in contact with the first circumferential side (not shown) of the at least one bottom wall panel 18 to form an end wall third joint. The end wall panel 16 is secured in place upon insertion of at least one fastener 52 through the end wall first joint, the end wall second joint, and the end wall third joint. In other embodiments, the end wall panel 16 may be affixed by any desired means, such as by adhesive or welding to name two non-limiting examples In one embodiment, the top wall panel 20 may be formed by placing a first portion of the first flange 40a in contact with a portion of the first circumferential side 28 of one of the side wall panels 14a to form a top wall first joint. A second portion of the first flange 40b may be placed in contact with a portion of the first circumferential side 28 of the other side wall panel 14b to form a top wall second joint. A third portion of the first flange 40c may be place in contact with a first portion of the first circumferential side 28 of one of the end wall panels 16a to form a top wall third joint. A fourth portion of the first flange 40d may be placed in contact with a first portion of the first circumferential side 28 of the other end wall panels 16b to form a top wall fourth joint. The top wall panel 20 is secured in place upon insertion of at least one fastener 52 through the top wall first joint, the top wall second joint, the top wall third joint, and the top wall fourth joint. In other embodiments, the top wall panel 20 may be affixed by any desired means, such as by adhesive or welding to name two non-limiting examples.

In another embodiment, the top wall panel 20 may be formed by placing a first portion of the first flange 40a in contact with a portion of the second circumferential side 36 of one of the side wall panels 14a to form a top wall first joint. A second portion of the first flange 40b may be placed in contact with a portion of the second circumferential side 36 of the other side wall panel 14b to form a top wall second joint. A third portion of the first flange 40c may be placed in contact with a first portion of the second circumferential side 36 of one of the end wall panel 16a to form a top wall third joint. A fourth portion of the first flange 40d may be placed in contact with a first portion of the second circumferential side 36 of the other end wall panels 16b to form a top wall fourth joint. The top wall panel 20 is secured in place upon insertion of at least one fastener 52 through the top wall first joint, the top wall second joint, the top wall third joint, and the top wall fourth joint. In other embodiments, the top wall panel 20 may be affixed by any desired means, such as by adhesive or welding to name two non-limiting examples.

In one embodiment, the cabinet 10 includes a first bracket 50 affixed to the distal end 46 of the at least two base rails 42, and a second bracket 50 may be affixed to the proximal end 48 of the at least two base rails 42 to provide rigidity and stability for the cabinet 10.

It will be appreciated that in some embodiments each the plurality of panels 12 include a first flange 40 such that the at least two side wall panels 14, at least one end wall panel 16, at least one bottom wall panel 18, and at least one top wall panel 20 forming the cabinet 10 for the air handler unit may be interlocked, and affixed to one another without the need of a frame member.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A cabinet for containing air handling equipment comprising:
   a plurality of panels affixed to one another to form an enclosure, the plurality of panels comprising at least two side wall panels, at least one end wall panel, at least one bottom wall panel, and at least one top wall panel, wherein the plurality of panels are constructed to form an opening in the cabinet to allow air to flow therethrough;
   wherein each of the plurality of panels comprises:
      a first panel member having a first panel member first side, a first panel member second side, and a first perimeter side at a first perimeter; and
      A second panel member having a second panel member first side, a second panel member second side, and a second perimeter, side at a second perimeter;
      wherein the second perimeter is smaller than the first perimeter, thereby forming a first flange;
      wherein the second panel member is affixed to the first panel member via an adhesive; and
   at least two base rails, each having a rail flange with a bottom portion and an outside portion, a distal end, and a proximal end, wherein the outside portion of each rail flange extends between a first panel member first side of one of the side wall panels and the first perimeter side of the first panel of the bottom wall panel.

2. The cabinet of claim 1, wherein the first panel member and the second panel member contain an insulation material.

3. The cabinet of claim 1, wherein the first panel member second side is selected from the group consisting of flat and pitched.

4. The cabinet of claim 1, further comprising a gasket affixed to the first flange.

5. The cabinet of claim 1, wherein each of the at least two side wall panels further comprises: at least one panel affixed to one of the at least two base rails, wherein a portion of the first flange is affixed to the outside portion of the rail flange of the one of the at least two base rails.

6. The cabinet of claim 1, wherein the at least one bottom wall panel comprises: a first portion of the first flange of the at least one bottom wall panel is in contact with the rail flange of one of the at least two base rails; and a second portion of the first flange of the at least one bottom wall panel is in contact with the rail flange of another of said at least two base rails.

7. The cabinet of claim 6, wherein the at least one end wall panel comprises:
   a first portion of the first flange affixed to a portion of the second perimeter side of one of the at least two side wall panels;
   a second portion of the first flange affixed to a portion of the second perimeter side of the other of the at least two side wall panels; and
   a third portion of the first flange affixed to the first perimeter side of the at least one bottom wall panel;
   wherein the first, second and third portions of the first flange are affixed via at least one fastener.

8. The cabinet of claim 7, wherein the at least one top wall panel comprises:
   a first portion of the first flange affixed to a portion of the first perimeter side of one of the at least two side wall panels;
   a second portion of the first flange affixed to a portion of the first perimeter side of the other of the at least two side wall panels; and
   a third portion of the first flange affixed to a portion of the first perimeter side of the at least one end wall panel;
   wherein the first, second and third portions of the first flange are affixed via at least one fastener.

9. The cabinet of claim 7, wherein the at least one top wall panel comprises:
   a first portion of the second perimeter side affixed to a portion of the first flange of one of the at least two side wall panels;
   a second portion of the second perimeter side affixed to a portion of the first flange of the other of the at least two side wall panels; and
   a third portion of the second perimeter side affixed to a portion of the first flange of the at least one end wall panel;
   wherein the first, second and third portions of the second perimeter side are affixed via at least one fastener.

10. The cabinet of claim 1, further comprising:
    a first bracket affixed to the distal end of each of the at least two base rails; and
    a second bracket affixed to the proximal end of each of the at least two base rails;
    wherein the first and second brackets are affixed via at least one fastener.

11. A cabinet for containing air handling equipment comprising:
    a plurality of panels affixed to one another to form an enclosure and an opening in the cabinet to allow air to flow therethrough, the plurality of panels comprising at least two side wall panels, at least one end wall panel, at least one bottom wall panel, and at least one top wall panel;
    wherein each of the plurality of panels comprises:
    a first panel member having a first panel member first side, a first panel member second side, and a first perimeter side at a first perimeter; and
    a second panel member having a second panel member first side, a second panel member second side, and a second perimeter side at a second perimeter, wherein the second perimeter is smaller than the first perimeter, thereby forming a first flange;
    at least one base rail extending below the at least one bottom wall panel, the at least one base rail each having a rail flange, with a bottom portion and an outside portion, wherein the at least one bottom wall panel comprises a first portion of the first flange of the at least one bottom wall panel being in contact with each rail flange of the at least one base rail; wherein at least one of the plurality of panels is affixed to the at least one base rail, wherein a portion of the first flange of the at least one of the at least two side walls panels is affixed to the outside portion of one of the rail flanges of the at least one base rail, wherein the outside portion of each rail flange of the at least one base rail extends between the first flange of one of the side wall panel and the first perimeter side of the first panel of the bottom wall panel; and wherein the second panel member is affixed to the first panel member via an adhesive.

12. A cabinet for containing air handling equipment comprising:
   a plurality of panels affixed to one another to form an enclosure and an opening in the cabinet to allow air to flow therethrough, the plurality of panels comprising at least two side wall panels, at least one end wall panel, at least one bottom wall panel, and at least one top wall panel; wherein each of the plurality of panels comprises:
   a first panel member having a first panel member first side, a first panel member second side, and a first perimeter side at a first perimeter; and
   a second panel member having a second panel member first side, a second panel member second side, and a second perimeter side at a second perimeter, wherein the second perimeter is smaller than the first perimeter, thereby forming a first flange; and
   at least one base rail, each having a rail flange with a bottom portion and an outside portion, wherein the at least one bottom wall panel comprises a first portion of the first flange of the at least one bottom wall panel being in contact with the bottom portion and the outside portion of each rail flange of the at least one base rail, and a portion of the first flange of each of the at least one of the at least two side wall panels is in contact with the outside portion of the rail flange of one of the at least one base rails, the outside portion of the one of rail flanges of the at least one base rail, and extends between the first flange of one of the at least two side wall panels and the first perimeter side of the bottom wall panel.

* * * * *